Figure 3:
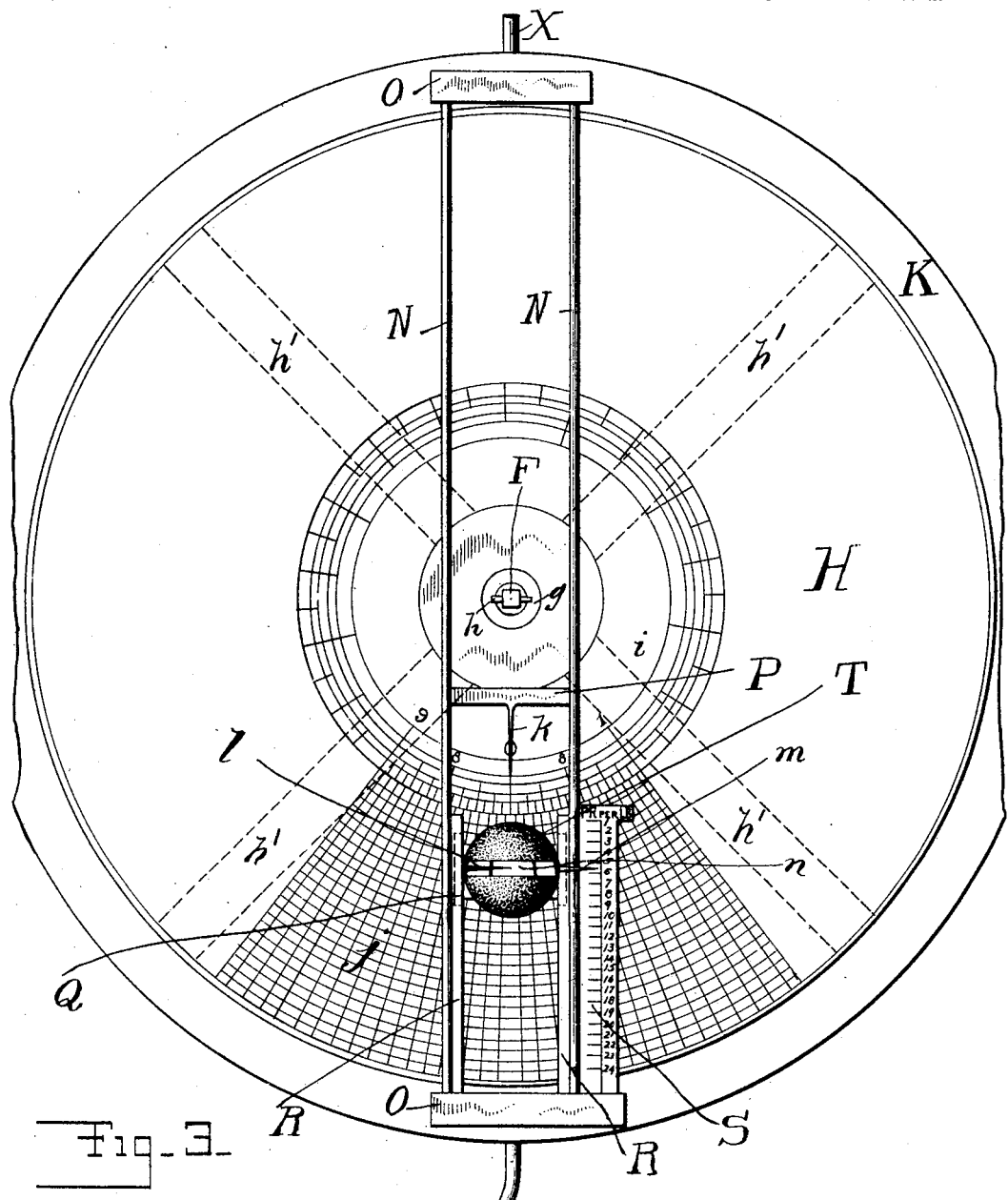

No. 684,629. Patented Oct. 15, 1901.
G. H. CHATILLON.
COMPUTING WEIGHING SCALE.
(Application filed Apr. 27, 1900.)
(No Model.) 3 Sheets—Sheet 1.
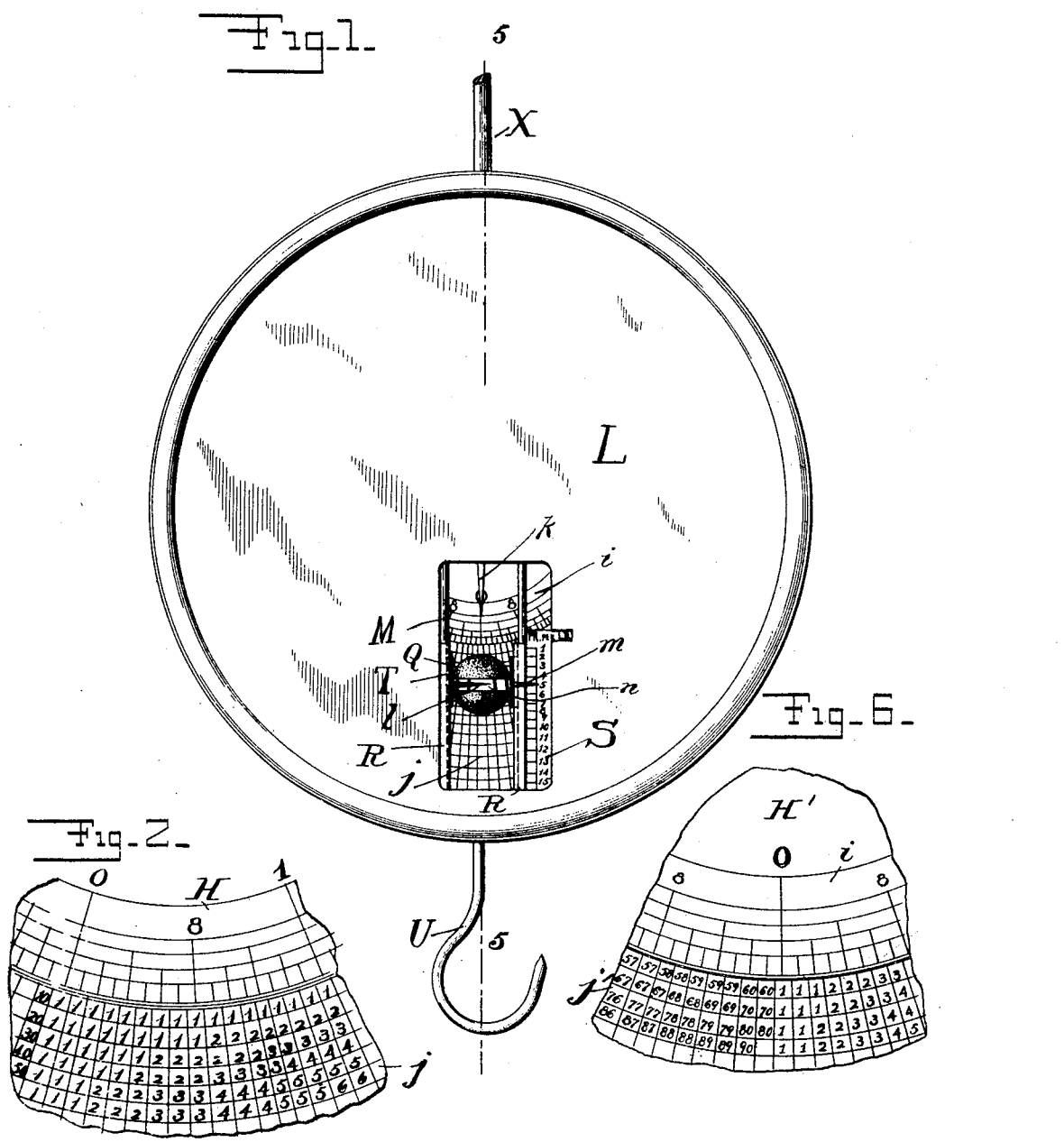

No. 684,629. Patented Oct. 15, 1901.
G. H. CHATILLON.
COMPUTING WEIGHING SCALE.
(Application filed Apr. 27, 1900.)

(No Model.) 3 Sheets—Sheet 2.

No. 684,629.  
G. H. CHATILLON.  
COMPUTING WEIGHING SCALE.  
(Application filed Apr. 27, 1900.)
(No Model.) 3 Sheets—Sheet 3.
Patented Oct. 15, 1901.
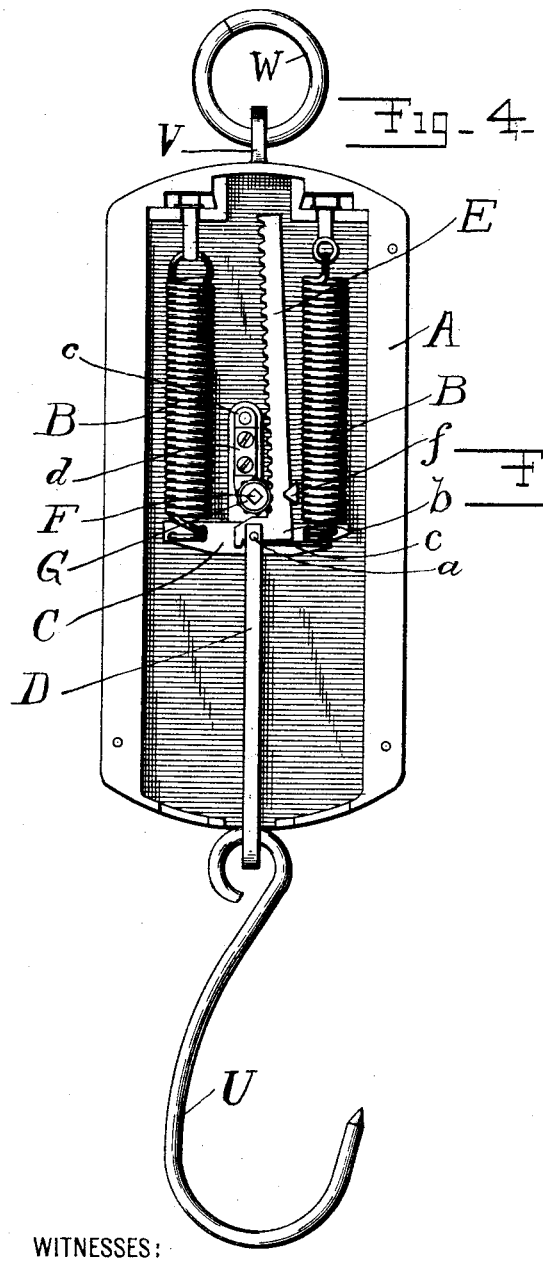
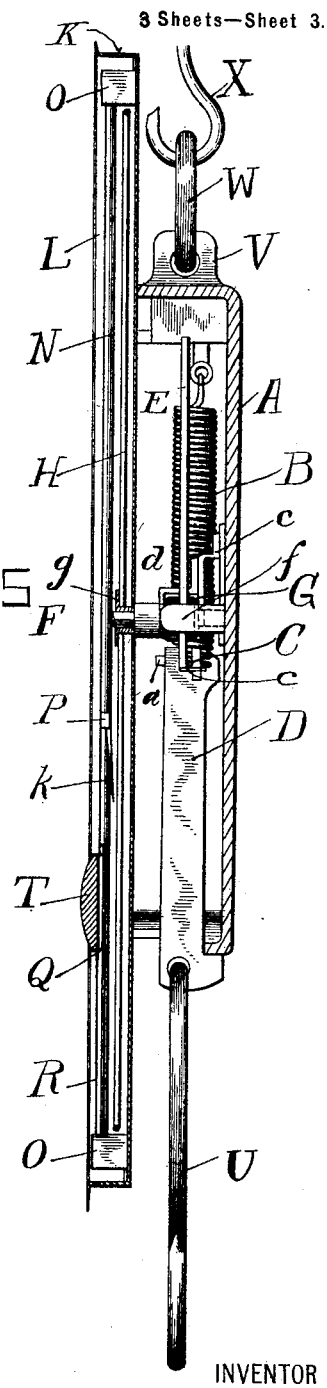
WITNESSES:  
John O. Gumples  
John A. Clark
INVENTOR  
George H. Chatillon  
BY  
Kenyon & Kenyon  
ATTORNEYS.
THE NORRIS PETERS CO., PHOTO-LITHO., WASHINGTON, D. C.

UNITED STATES PATENT OFFICE.

GEORGE H. CHATILLON, OF NEW YORK, N. Y.

COMPUTING WEIGHING-SCALE.

SPECIFICATION forming part of Letters Patent No. 684,629, dated October 15, 1901.

Application filed April 27, 1900. Serial No. 14,560. (No model.)

*To all whom it may concern:*

Be it known that I, GEORGE H. CHATILLON, a citizen of the United States, and a resident of the city, county, and State of New York, have invented certain new and useful Improvements in Computing Weighing-Scales, of which the following is a specification.

My invention relates to weighing-scales wherein the weight of the article or articles being weighed and the selling price of the same may be indicated and correctly and automatically computed and indicated.

The principal objects of my invention are to provide such a computing-scale as will correctly, automatically, and instantly compute and indicate both the weight and the price of the article being weighed; also, to provide means whereby nearly all of the price-marks near and surrounding an indicated price-mark may be covered up, so as to avoid confusion in endeavoring to read the mark indicated; also, to provide means for magnifying the mark indicating the proper price of the article or articles being weighed; also, generally to improve and simplify the computing-scale.

My improvements consist in the novel devices and combinations of devices herein shown and described.

In the accompanying drawings I have shown one embodiment of my invention, in which the computing-table is represented as a disk.

Figure 1 is a front elevation. Fig. 2 is a fragmentary view, enlarged, of the computing table or dial. Fig. 3 is a similar view to Fig. 1, but enlarged, and with the front plate of the dial-casing removed and only a portion of the indicating-marks being represented. Fig. 4 is a front elevation, enlarged, of the scale, but with the dial and other computing devices removed. Fig. 5 is a vertical section, enlarged, through the axis of the dial on the line 5 5 of Fig. 1. Fig. 6 is a similar view to Fig. 2, but showing a slightly-different arrangement of the rows of price-marks.

Similar letters represent like parts in all the figures.

A is the casing inclosing the draft or actuating mechanism of the scale.

B B are the two draft or controlling springs, suspended by their upper ends in the upper end of the casing A.

C is a cross-bar connecting the lower ends of the springs and to which bar said springs are secured.

D is the draft-bar, secured to the cross-bar C between the springs B B and preferably made integral with said bar. The draft-bar D, with the cross-bar C, constitutes the runner of the scale.

E is a substantially vertical rack provided with a foot $b$ at its lower end, and which is loosely pivoted to the draft-bar D at $a$.

F is an arbor loosely journaled in bearings $c$ and $d$ in the casing A.

G is a pinion secured to the arbor F and engaging with the rack E. A flat tension-spring $e$, secured to the cross-bar C and bearing upon the under side of the foot $b$, tends to keep the rack constantly in engagement with the pinion, and a finger $f$, secured to the back of the casing A and extending over the back of the rack E, serves to guide said rack vertically and also assists the spring $e$ in preventing the rack from falling away from the pinion.

H is a circular or disk-shaped dial having a hole in its center, through which passes a flanged bushing $g$. This bushing is secured to the dial with its flange extending over the front of the same. The bushing is provided with an angular opening which fits over the corresponding angular end of the arbor F, so that when said arbor turns the bushing and dial are turned with it. A cross-pin $h$ passes through the hole in the arbor $f$ outside of the bushing $g$ in order to securely and removably hold the dial upon the arbor. The dial H is preferably made of cardboard or some similar material and has light cross-braces $h'$, secured to its back in order to make it more firm and durable. Any stiffening device may, however, be used for this purpose.

The dial H is provided with the following indicating-marks: first, a series of circles $i$, divided off, respectively, to indicate pounds and portions of pounds. Next, extending radially from each weight-mark of the series $i$ is a column $j$ of marks arranged directly under or radially with said weight-marks and representing the price of the article or articles to be weighed, the marks radiating from each weight-mark representing the different prices of the article or articles having such weight at different prices per unit of weight, the inner circle constituting the first mark of each one of these columns $j$, consisting of marks for designating the lowest price per unit of weight of the different weights which these marks are under. The second circle of these marks $j$ will indicate the next lowest price of the unit of weight. The third circle will indicate the third lowest price per unit of weight, and so on.

K is a circular casing for the dial and computing mechanism. The rows of the two sets of marks $i$ and $j$ will thus be transverse to each other. The front plate L of the dial-casing K is provided with an opening M, extending from a little above the inner weight-marks $i$ to the outmost row or circle of the price-marks $j$.

N N are two parallel rods secured to cross-bars O O at the top and bottom of the casing K and within said casing. Secured to said cross-bars and between the same is another cross-bar P, provided with a downwardly-extending pointer $k$, said pointer being in line with or overlapping the weight-marks $i$.

Q is a sliding frame held between the parallel bars N N and arranged and constructed to slide up and down said bars in parallel guideways R R.

S is a scale to the side of one of the bars N and divided off into marks indicating the prices per unit of weight, the highest mark being for the lowest price per unit, the mark just below it for the next lower price per unit, and so on, the lowest mark being the highest price per unit. In the drawings the scale S is marked to designate the different prices per pound, though the same marks could be applied in computing the prices for one-half pound, one-quarter pound, one ounce, or any unit of weight. The marks of the scale S, starting from the top and extending to the bottom, are arranged opposite the different circles or rows of marks from the inner to the outermost one, respectively. I have shown the numbers forming the marks of the columns $j$ as indicating the different prices of the articles to be weighed when the unit of weight is one pound. In this instance the numbers of the scale S indicate the different prices per pound.

The slide Q is provided with two pointers $l$ and $m$, the pointer $l$ extending to or over the column $j$, which is under and radial with the weight-pointer $k$, and the pointer $m$ extending toward the marks on the scale S.

T is a plano-convex lens, with its upper and lower sections ground or non-transparent, but leaving a horizontal diametrical portion $n$ of about the width of the numbers of the scale $j$ transparent, and so as to form a magnifier over the computed or reading number of said scale. The magnifier $n$ is made to extend across the lens, so as to allow all of the computed number to be clearly seen, even when the dial is vibrating and unsteady, during the process of weighing.

U is the ordinary hook secured to the lower end of the draft-bar D and on which the scale-pan is adapted to be hung.

V is an eye at the upper end of the frame A, through which a ring W passes, said ring providing the means for hanging up the entire apparatus, a hook X being shown in the drawings on which said ring W and the weighing-scale are suspended.

The operation of the apparatus is as follows: The dial H having been first so arranged and placed upon the arbor F that the pointer $k$ will be in a line with or over a mark in the scale $i$ indicating zero, the lens T is slid along the guides R so that the pointer $m$ will be opposite the number on the scale S, which will indicate the price per pound of the article or articles to be weighed.

Such article or articles are next placed upon the scale-pan and the draft-bar D, and the rack E is drawn down by the weight, said rack rotating the pinion G and the disk dial H until the action of the springs B B brings the downward movement of the parts of the bar D and rack E and the rotary movement of the dial H substantially at rest. The mark or number that the pointer $k$ now points to or is in line with will be the proper weight of the article or articles. The number that the pointer $l$ will point to or be over will be in the column under the indicated weight-mark and will be at the price of the article or articles that are being weighed, the magnifier $n$ showing clearly to the purchaser the price that has to be paid, the number on the scale S that the pointer $m$ points to clearly indicating also the price per pound, and the number that the pointer $k$ points to or is in line with also indicating the exact weight, as above stated. For example, suppose that a purchaser wishes to buy four pounds of sugar at six cents per pound. The salesman first draws down the lens T so that the pointer $m$ will be in line with the number "6" on the scale S. The sugar is then put in the scale until its weight rotates the disk H so that the pointer $k$ will be in line with the number "4" on the inner circle of the scale $i$, and the weight will therefore be just four pounds. The number under the magnifier $n$ and under or directly in line with the pointer $l$ will be "24," being the sixth number in the row in the column of the scale $j$, directly under the weight-number "4." The customer will then see clearly from the scale that he should pay twenty-four cents, that the sugar he is buying is six cents a pound, and that four pounds have been weighed. Again, if a customer comes to buy an article like meat, and it is difficult to put upon the pan the exact weight, and he asks for a piece of meat between two and three pounds, the butcher puts the piece of meat upon the scale the price of which is fifteen cents a pound. He then draws down the lens T so that the pointer m will be opposite the mark "15" on the scale S. The weight of the meat then rotates the disk dial H, and the exact weight of said meat will be indicated by the pointer k on the circular dial i. Suppose it be found that the said pointer k points to the mark "2½." This will indicate that the weight of the meat is just two and one-half pounds. The magnifier n will then be over the fifteenth number in the column of the scale j under the weight-mark "2½," and the pointer l will point to "38," and the customer would clearly see that he is buying two and one-half pounds of meat at fifteen cents a pound and will have to pay thirty-eight cents for it.

In Fig. 2 I have shown a fragment of the dial H, in which the innermost circle of numbers of the scale j indicates prices at one unit of value—say one cent or one dollar; but if the merchant does not care to weigh anything on his scale having such a low price as, say, one cent a pound the inner circle of the scale j' (see Fig. 6) should be composed of numbers indicating the prices of different weights at a higher price per pound—as, for example, six cents. The next outer row of figures would indicate the prices at seven cents per pound, the next row at eight cents, and so on. In this case, however, the scale S should have the number "6" in line with the innermost circle of the scale j', the number "7" in line with the next outer circle, the number "8" in line with the third outer circle, and so on.

Although I have shown the table of indicating-marks made in the form of a circular disk, this is not essential in some embodiments of my invention or in some of its features. Neither is it necessary for the broad features of my invention for the table or dial to move and the weight-pointer, price-per-pound pointer, and the magnifier to be stationary relatively to the table and dial as long as the two are movable relatively to each other.

It is not necessary that all the marks near and around the indicated price-mark be concealed, as such marks may vary in size, and there must be provision for reading a mark of the largest size on the table or dial. It is also better to have provision for seeing the indicated price-mark wide enough to extend somewhat on each side of the same, because in weighing an article or articles the moving parts will dance or vibrate back and forth and will not be stationary, so that provision should be made for seeing the entire number indicated during such vibration. The magnifier or opening in the sliding indicator is so made, therefore, that marks on both sides of the one pointed out are wholly or partly visible.

What I claim as new, and desire to secure by Letters Patent, is—

1. In a computing-scale, the combination with a computing-table provided with two sets of marks arranged transversely with each other, the marks in one set representing a scale of weights and the marks in the other set representing a scale of prices, and the price-marks arranged radially to the weight-marks, a frame supporting said table, a column of marks for indicating the price per unit of weights arranged with said marks respectively opposite the price-marks in the radial columns, an indicator supported by the said frame and adjustable over the said table along the radial column of price-marks and along the price-per-unit-of-weight marks, and having two pointers adapted to register with the marks respectively of said columns, and a magnifying-glass over one of said columns and in line with said pointer and columns, and means actuated by the article being weighed for causing the proper price-marks and the indicator to register one with the other, whereby the price of the article being weighed may be clearly and directly indicated.

2. In a computing-scale, the combination with a computing-table provided with two sets of marks arranged transversely with each other, the marks in one set representing a scale of weights and the marks in the other set representing a scale of prices, and the price-marks arranged radially to the weight-marks, a frame supporting said table, a column of marks for indicating the price per unit of weights arranged with said marks respectively opposite the price-marks in the radial columns, a pointer or indicator supported by said frame and adapted to register with the weight-marks, an indicator supported by the said frame and adjustable over the said table along the radial column of price-marks and along the price-per-unit-of-weight marks, and having two pointers adapted to register with the marks respectively of said columns, and a magnifying-glass over one of said columns, and in line with said pointer and columns, and means actuated by the article being weighed for causing the proper price-marks and the proper indicator to register one with the other, whereby the price of the article being weighed may be clearly and directly indicated.

3. In a computing-scale, the combination with a computing-table provided with two sets of marks arranged transversely with each other, the marks in one set representing a scale of weights and the marks in the other set representing a scale of prices, and the price-marks arranged radially to the weight-marks, a frame supporting said table, a column of marks for indicating the price per unit of weights arranged with said marks respectively opposite the price-marks in the radial columns, an indicator supported by the said frame and adjustable over the said table along the radial column of price-marks and along the price-per-unit-of-weight marks, and adapted to register with the marks respectively of said columns, and provided with means for concealing marks surrounding the registered price-mark, and means actuated by the article being weighed for causing the proper price-marks and the indicator to register one with the other, whereby the price of the article being weighed may be clearly and directly indicated.

4. In a computing-scale, in combination with a computing-table, an indicator adapted to be moved over the marks of said scale, and said indicator consisting of a glass, a part only of which is transparent, whereby only that portion of the scale under said transparent part of the glass will be visible, all as set forth.

5. In a computing-scale, in combination with a computing-table, an indicator adapted to be moved over the marks of said scale, said indicator consisting of a glass, a part only of which is transparent said part being of magnifying quality, whereby only that portion of the scale under said transparent part of the glass will be visible, all as set forth.

In testimony whereof I have signed my name to this specification in the presence of two subscribing witnesses.

GEORGE H. CHATILLON.

Witnesses:
LOUIS A. TRANBERG,
MADS P. MADSEN.